United States Patent

Thyselius

[11] 3,940,562
[45] Feb. 24, 1976

[54] TRANSIT EXCHANGE FOR TIME DIVISION MULTIPLEX ASYNCHRONOUS DATA

[75] Inventor: Per-Olof Thyselius, Tyreso, Sweden
[73] Assignee: Telefonaktiebolaget L M Ericsson, Stockholm, Sweden
[22] Filed: July 24, 1974
[21] Appl. No.: 491,274

[30] Foreign Application Priority Data
Aug. 10, 1973 Sweden.............................. 7310969

[52] U.S. Cl........................ 179/15 BA; 340/172.5
[51] Int. Cl.² ............................................. H04J 3/00
[58] Field of Search ................. 179/15 A, 15 BA; 340/172.5; 178/50

[56] References Cited
UNITED STATES PATENTS
3,764,989    10/1973    McClellan...................... 340/172.5

Primary Examiner—William C. Cooper
Assistant Examiner—E. S. Kemeny
Attorney, Agent, or Firm—Hane, Baxley & Spiecens

[57] ABSTRACT

The present invention relates to a transit exchange for the transmission of asynchronous data signals having a given character structure and data rate, with the aid of a control equipment, including a computer and a sampling device, which is common to a number of sending terminal equipments and works on the time division multiplex principle. The instantaneous values of the data signals received over each of a number of incoming lines are sampled at a frequency so selected in relation to the asynchronous data rate that at least one sampling pulse falls within a distortionless region of the respective character element. The transit exchange includes a detector working synchronously with the sampling device to establish, by means of the successive processing of the sampling pulses, the binary value of each character element. Corresponding binary indication values are stored in an intermediate memory at an addressed location associated with the receiving terminal equipment and from there are transferred cyclically by a read-out device to a regeneration device corresponding to the receiving terminal equipment. From the indication values the regeneration device forms data signals which change value in synchronism with the indication signals.

7 Claims, 6 Drawing Figures

Fig.6 ics. 3,940,562

TRANSIT EXCHANGE FOR TIME DIVISION MULTIPLEX ASYNCHRONOUS DATA

The present invention relates to a transit exchange for transmission of asynchronous data signals with given character structure and data speed by means of a control equipment working with the time division multiplex principle.

A method known through German Offenlegungsschrift 1437794 for transmission of asynchronous data signals using the time division multiplex principle is characterized in that data signals arriving on a line to the transit exchange are decoded and stored, character by character, in a receiving line equipment, from which the characters are fetched by a transfer unit, usually a computer, and placed in a sending line equipment for forwarding on the associated line. The disadvantage of this method if the large costs associated with the storage of data characters both in receiving and sending line equipments and in the transfer unit, and the considerably delay to which the data signals are subjected due to this storage, a delay which will be especially troublesome in the passage through a number of tandem-connected exchanges.

According to another method known through published Swedish application No. 347407, changes of state of incoming data signals are detected, i.e. switching from binary 0 to binary 1 and vice versa, by a receiving line equipment, after which these changes, with the aid of address information stored in a computer, are transferred to a sending line equipment. This method admittedly eliminates the delay occurring with the foregoing method but has instead two other disadvantages. On the one hand no regeneration of the transmitted characters takes place with respect to the pulse times of the individual character elements, and on the other the switching process contributes a certain time distortion which is dependent on the momentary load on the computer, i.e. a random prolongation of the pulse times.

An object of the invention is to minimize the transit time for the switching of asynchronous data signals with the simultaneous characterwise regeneration of the pulse times of the character elements. This is achieved in the manner that the data signals arriving from a receiving line equipment, after polarity determination in a detector, are stored, element by element, in an intermediate memory from which they are transferred, still element by element, to a read-out device in which the characters are regenerated by means of a synchronous clock signal in conjunction with feed-out to a sending line equipment. The characteristics of the invention appear from the claims.

The invention will be explained below by means of an embodiment with reference to the accompanying drawing, in which.

Figure 1:
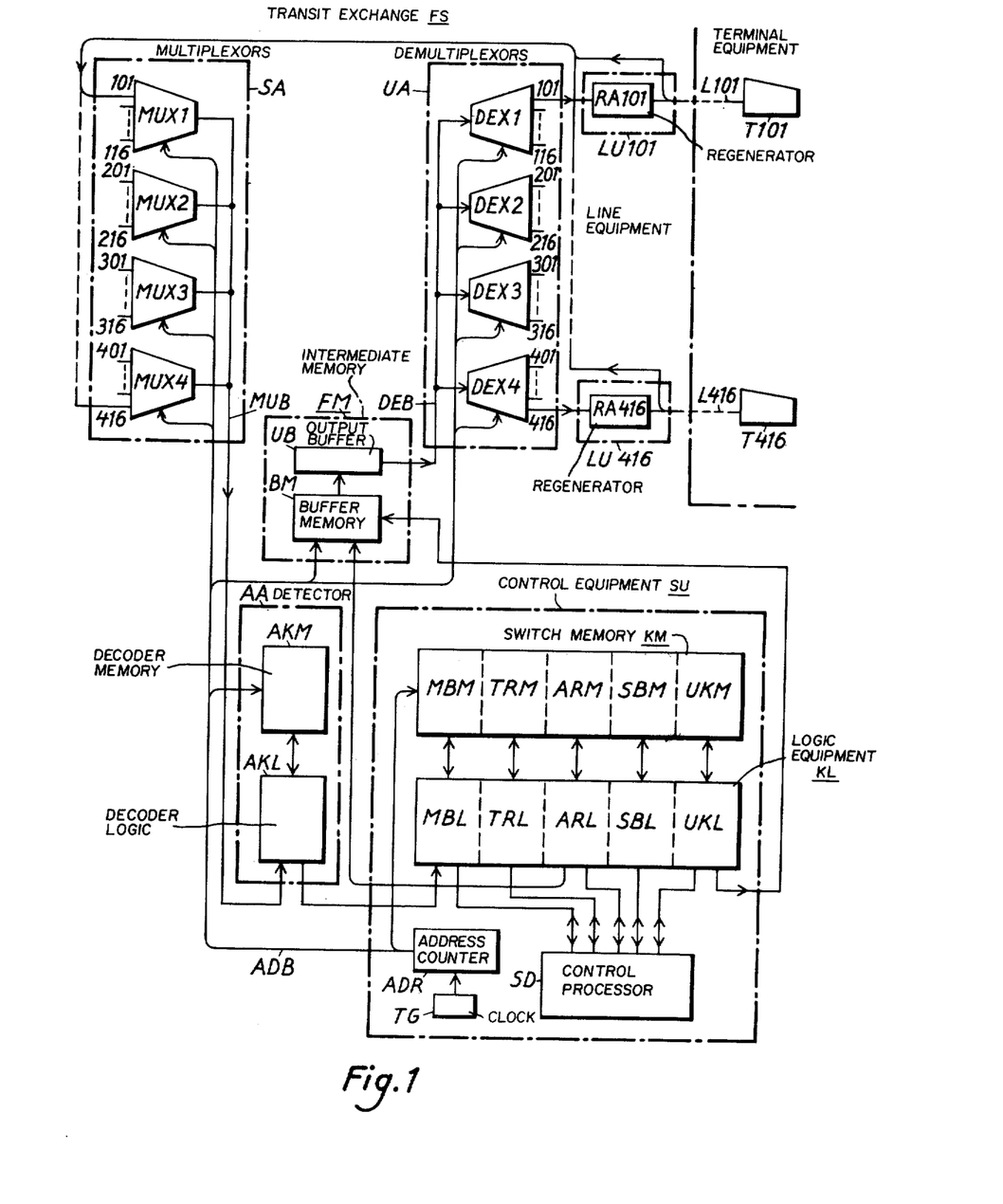
FIG. 1 shows a transit exchange for switching of TELEX signals.

FIG. 1 shows a transit exchange FS to which $4 \cdot 16 = 64$ terminal equipments T 101 - T 416 are connected on their respective circuits L 101 - L 416 and associated line equipments LU 101 - LU 416. All terminal equipments are assumed to work at the asynchronous modulation rate of 50 bauds and utilize a character structure and signalling scheme according to the international TELEX standard. This implies that every character signal comprises 7 binary character elements, of which the first constitutes the start element and the last the stop element, and the five intermediate elements are information-carrying data elements. The standard structure also implies that the nominal length of each of the first six elements corresponds to a unit interval of 20 ms, while the stop element is prolonged to normally 1.5 unit intervals = 30 ms. The resulting nominal character speed will therefore be $50/7.5 = 6.67$ characters/s. With manual transmission from a terminal, however, the average character speed will be lower, which is noticeable since the stop elements will be still longer. Typical of the asynchronous method of transmission, therefore, is that the phase position of a character element is correlated only to the phase position of the other elements within the same character and that the receiver must derive the element phase from each start element and change to a waiting condition during every stop element.

Each of the 16 line equipments, e.g. LU 101 - LU 116, is connected to a multiplexor unit, e.g. MUX 1, and to a demultiplexor unit, e.g. DEX 1, the purpose of which is, in selected time slots, to through-connect a circuit to an incoming bus MUB and to an outgoing bus DEB. The multiplexor units MUX 1-4 together constitute a sampling device SA for the values of the incoming signals, and the demultiplexor units DEX 1-4 together constitute a read-out device UA for transmission of indication values relating to the values of the outgoing signals to a regeneration device RA in each line equipment, as will be described in greater detail. In addition to the regeneration device the line equipments contain circuits of conventional type for translation between the signal representations used on the line and exchange sides respectively.

Figure 2:
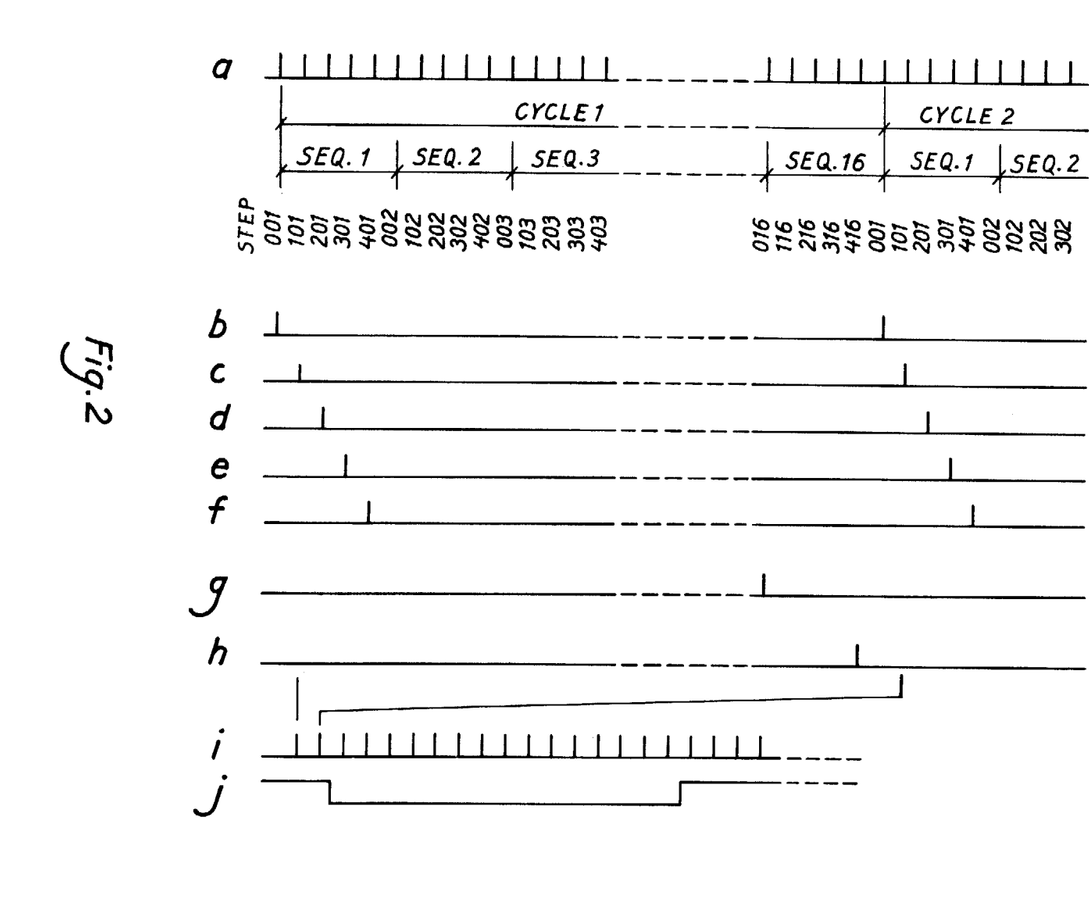
FIG. 2 shows a number of timing diagrams which illustrate the mode of operation of the transit exchange.

On the busses MUB and DEB the character elements are transmitted, which were received and sent, respectively, via the line equipment LU, in the form of sampling and indication values, respectively, in a time sequence determined by an address counter ADR and with a density determined by a clock or timing generator TG, e.g. 15 per unit element and line. See the timing diagram in FIG. 2, lines a), c), i) and j). Interconnection of a calling terminal equipment, the A subscriber, with the desired other terminal equipment, the B subscriber, takes place in a central switching equipment comprising a control equipment SU with a control processor SD. The switching equipment also comprises a buffer memory BM connected to an output buffer UB, which form part of an intermediate memory FM, and a switch memory KM, in which received character elements are temporarily stored while being processed by a logic equipment KL. The logic equipment comprises the subunits MBL, TRL, ARL, SBL and UKL, which interact with their respective associated memory fields in memory KM - viz. MBM, TRM, ARM, SBM, UKM - as will be described in greater detail. The transit exchange also contains a detector device AA which, on the basis of the sampling values, establishes the informational content of the received signals and, depending on the value established, produces a binary indication signal. According to the example, however, it is assumed that the detector device consists of a device according to the Swedish patent application 73.10968-8. The device thus comprises a decoder memory AKM and a decoder logic AKL, as will be explained below.

Each memory field in the switch memory, as also the decoder memory and buffer memory, has 64 memory positions corresponding to each of the 64 line equipments, and these positions are addressed at the same time as the respective line equipment obtains access to the busses MUB and DEB for writing into the decoder memory and reading out from the output buffer of the associated sampling and indication values respectively. The addressing takes place cyclically and every addressing cycle, in order to facilitate the read-out from the inermediate memory to the read-out device, is divided into 16 sequences of five steps each. During the first of the five steps four indication values are transmitted from the buffer memory BM to the output buffer UB, each relating to a line equipment in its respective 100-line group, e.g. LU 101, LU 201, LU 301 and LU 401. During the other four steps in the same sequence addressing of these line equipments takes place, the sampling and indication values being transmitted from and to them, respectively, via the busses MUB and DEB respectively. This will be seen from FIG. 2 lines b) - f).

When the A subscriber's terminal, e.g. equipment T 101, is in its rest position, the sampling values occurring during addressing stage No. 101 on bus MUB represent a binary zero (0). On receipt of a call the state changes to binary one (1), whereupon the decoder logic AKL is activated and stores information concerning the event in the corresponding position in the decoder memory AKM. After 15 sampling values have been recorded, which corresponds to one unit interval, the information content of the element is evaluated. If it is found to be 1, it is transferred via the logic unit MBL to the memory position of the A subscriber in the receive buffer MBM, after which the next unit interval is scanned, and so on. In the receive buffer, seven signal elements, corresponding to the length of a TELEX character, are stored and, if all are 1, a call indication is transferred to the logic unit TRL for updating of the memory position of the A subscriber in the state register TRM, at the same time as the A subscriber's address is written into the corresponding position in the address register memory ARM. An acknowledgement of the call, independent of the control processor, is also made in such manner that output data to the A subscriber are changed from 0 to 1 by writing into the buffer memory BM in the manner described later.

The call indication is also transferred to the control processor SD, which identifies the A subscriber by means of the information in the address register. If the control processor is prepared to receive selection information from the A subscriber, the TELEX character G is first written into the A subscriber's position in the send buffer memory SBM, from which it is fetched, element by element, by the encoder logic UKL, and is stored in the associated memory UKM. From there indication pulses, the values of which represent the respective character elements, are transferred to the A subscriber's position in the buffer memory BM, from which, via the output buffer UB, they are fed on bus DEB and, in the A subscriber's time slot, directed through the demultiplexor DEX 1 to line equipment LU 101. Here, with the aid of the regeneration device RA 101, the indication values are combined into character elements which are transmitted on line L 101.

When the entire character G has been collected from the send buffer, the control processor writes the character A, the second character in the signal GA (Go Ahead), which is also sent to the A subscriber. The control processor SD marks in the state register that this phase in the procedure has been completed.

The A subscriber is now expected to send selection information in the form of a specific number of TELEX characters, identifying a B subscriber (or a special service), within a specified period of time. If this transmission does not take place, the control processor initiates the clearing of the A subscriber by restoring the output data to 0 and restoring the A subscriber's memory word in the switch memory. If, on the other hand, selection information arrives, the characters are analysed, element by element, by the decoder logic and combined in the receive buffer as previously described, from which the characters are fetched one at a time by the control processor. When the necessary number of characters has been received for identification of the B subscriber, the control processor enters the corresponding position in the state register and investigates whether the subscriber is accessible. If not, this fact is sent to the A subscriber in the form of a number of characters, a so-called service signal, after which the A subscriber is cleared. If the B subscriber is accessible, the control processor writes the call state into the state register, after which output data in the B subscriber's memory position in the buffer memory BM are changed from 0 to 1, implying a call signal to the B subscriber's terminal, e.g. equipment T 416. During the first addressing step in the sequence in which line equipment LU 416 is addressed, i.e. during stage 016, the indication values of the call signal are transferred to the output buffer UB, whence, during addressing step 416, they are transmitted via bus DEB and demultiplexor DEX 4 to line equipment LU 416 for combination into a continuous signal in regeneration device RA 416.

When answering, the terminal T 416 executes a shift from 0 to 1 in the direction towards the transit exchange, which, after being decoded, is sent to the control processor via the receive buffer. The control processor writes a connect-through message CT in the send buffer positions of both subscribers and, when this signal has been transmitted, the fact is marked in the state register and at the same time the information in the address register is changed. Hitherto the memory position of each subscriber in the address register has addressed its own line equipment but, on connect-through, these addresses are reversed. Furthermore the through-connection has the result that the character elements which are decoded in the decoder are directly transmitted to the encoder for storage in the encoder memory. The receive buffer, however, continues to receive all elements in order to be able to detect a clearing signal from with ther A or B subscriber. The reversal of the addresses in the address register has the result that the indication values read out of the encoder memory in the A subscriber's memory position can be written into the B subscriber's memory position in the buffer memory, and vice versa. The through-connection thus takes place by change of the time slot on transmission from switch memory to buffer memory.

The request for clearing consists of the continuous transmission of 0 by either terminal. When the receive buffer finds a character with solely 0 elements, this is noted in the state register, while the control processor identifies the associated addresses. Both terminals are then cleared and the associated memory positions in the address register are zeroed.

The above described connecting and clearing process in itself does not constitute a part of the invention but is described here solely in order to present a more complete picture of the mode of operation of the transit exchanges. The computer may be a real time computer of any known type used in telecommunications.

The basic principle of the invention can very well be explained by means of the description of a stationary state when two subscribers are connected to one another, without taking into consideration how the connection has been set up.

Figure 3:
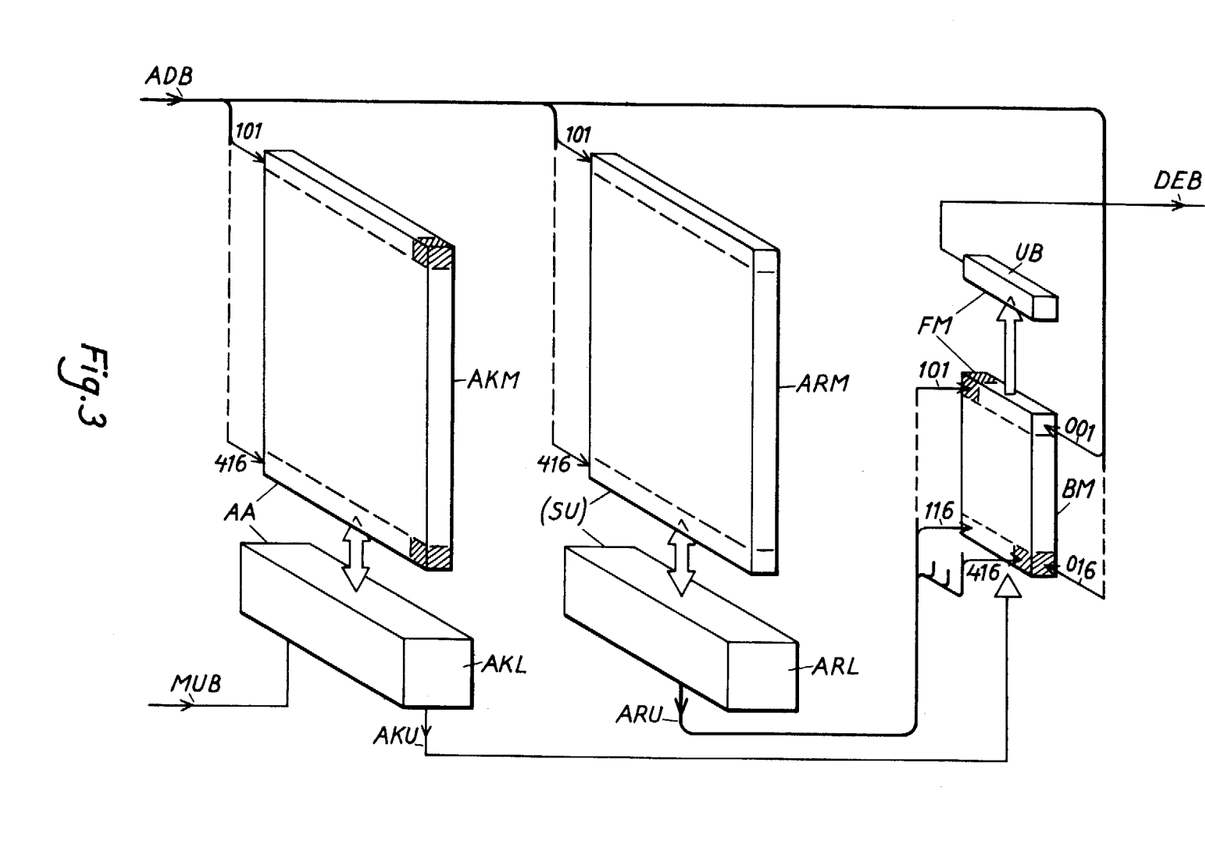
FIG. 3 is the block diagram of the device according to the invention.
Figure 4:
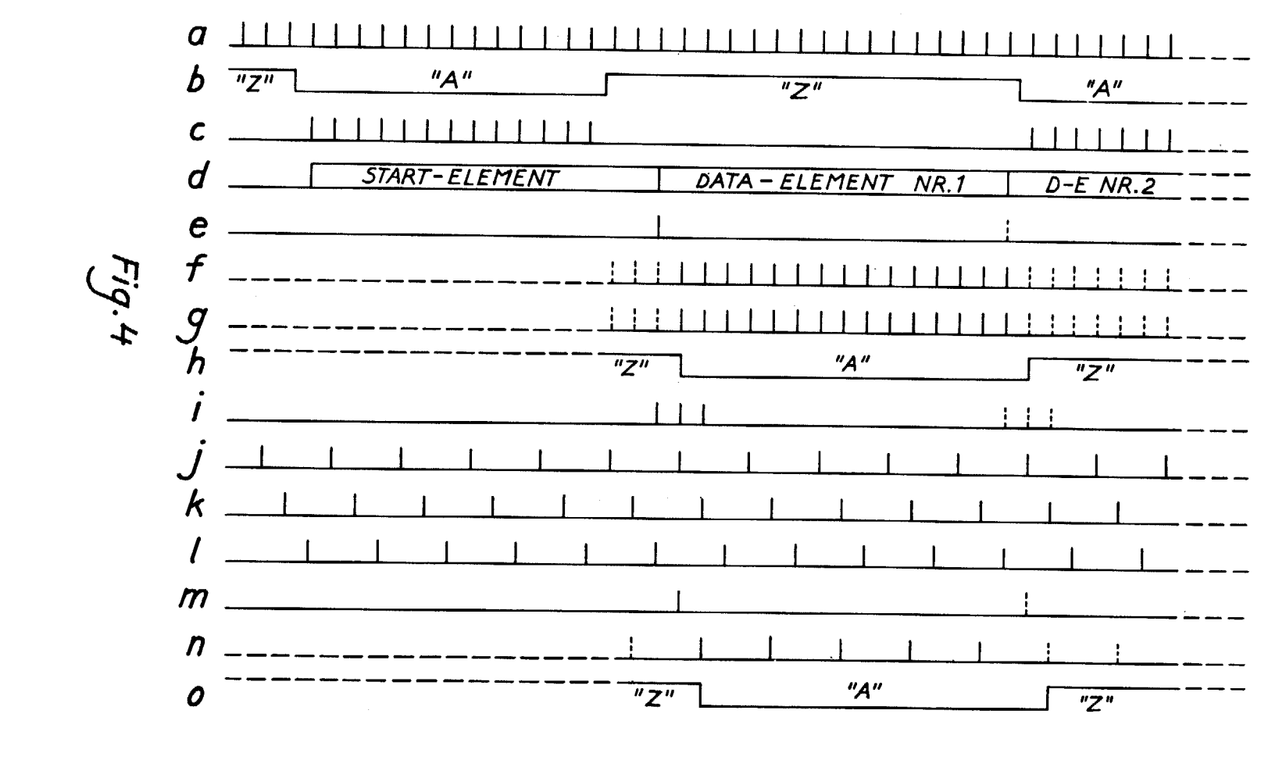
FIG. 4 shows a number of timing diagrams for illustration of the operation of the device according to FIG. 3, and FIGS. 5 and 6 show two alternatives for extension of the capacity of a transit exchange.

FIGS. 3 and 4 show in simplified form the functions which are of interest when describing a stationary state, when information in the form of asynchronous TELEX characters is exchanged between two connected subscribers.

FIG. 3, accordingly, shows the detector device AA with decoder memory AKM and decoder logic AKL, the address register memory ARM with associated address register logic ARL in control equipment SU, and the intermediate memory FM containing the buffer memory BM and output buffer UB.

The A and B subscribers are represented by the memory addresses 101 and 416. Corresponding to each address there is a memory word in each of the memory fields AKM, ARM, and a memory bit in the buffer memory BM. The memory bits in memory BM are arranged in 4-bit words which can be accessed via special address inputs, in the example 001 and 016.

The bus ADB is in connection with the address counter ADR shown in FIG. 1. The busses MUB and DEB are in connection with the multiplexor and demultiplexor units respectively, also shown in FIG. 1.

The timing diagram of FIG. 4 illustrates the course of events in the transmission of TELEX characters from A to B subscriber. The pulse train on line a) indicates the times when the address counter is in position 101, i.e. when the memory words of the A subscriber are addressed in the memory fields AKM and ARM and the line equipment LU 101 of the A subscriber is addressed in the multiplexor unit MUX 1. This addressing step recurs at the repetition frequency 15 times per unit interval of the TELEX characters, which implies that the sampling values, relating to characters incoming from the A subscriber, are transmitted at this frequency to the decoder logic AKL via bus MUB. On line b) are shown character elements incoming from line L 101, where the first switching from Z to A state marks the beginning of a start element. The start element is accompanied by 5 data elements, the first of which is shown in its entirety, and by a stop element which corresponds to Z state. The Z state shown in the far left represents such a stop element associated with the preceding TELEX character. See also FIG. 2, lines c), i) and j). From the multiplexor unit there are received from bus MUB in synchronism with the pulse train on line a) in FIG. 4 sampling values which follow the changes of polarity of the received character elements. From line c), representing the signal state on bus MUB, it appears that the decoder logic AKL is supplied with positive pulses during the intervals when received character elements have start polarity, i.e. A state. The first of these pulses starts in logic AKL a timing counter function which establishes a reference for the incoming character. On line d) this is shown schematically in the form of a rule with markings for the nominal extent of the various character elements in relation to the first received pulse on line c). In the decoder logic an evaluation is also made of the informational content in each character element having regard to specific decision criteria in order to eliminate false sampling values caused by imperfections in the received character. The start element in this case is thus assumed to have been shortened to a length corresponding to 13-14 sampling intervals, against the nominal length of 15 sampling intervals, owing to distortion in transmission. A manner of executing the decoder logic is described in the Swedish patent application 73.10968-8.

After completion of signal processing of the sampling values of a character element, i.e. 15 sampling values, information concerning the binary value of the element is stored, in this case 1, in the A subscriber's memory word, address 101, in the decoder memory AKM. This information is symbolized in FIG. 3 by the upper shaded portion of AKM. For character elements arriving from the B subscriber, information is stored correspondingly in the address 416, i.e. the lower shaded portion. Simultaneously with the start of processing of data element No. 1 the decoder logic AKL maks the stored information concerning the start element accessible on an output AKU during the addressing step 101 shown by the fully drawn pulse on line e) in FIG. 4. On this occasion a transfer of the element information takes place from the decoder memory AKM to the buffer memory BM. On write-in in the buffer memory BM the element information derived from the A subscriber is placed in the B subscriber's memory cell, and vice versa. For this purpose address information is used which has been stored in the address register memory during a switching phase when selection information was received from the A subscriber and analysed by the control processor shown in FIG. 1. In memory ARM the latter has written the B subscriber's address, 416, into the A subscriber's memory word 101 and the A subscriber's address 101 into the B subscriber's memory word 416. At each read-in, according to line e), the buffer memory thus fetches, via output ARU from the logic unit ARL of the address register, information concerning the memory cell in BM to which the simultaneously received element information from the decoder logic AKL is to be taken, in the example accordingly to address 416.

As earlier described, the addressing from the address counter ADR takes place cyclically, each addressing cycle comprising 16 sequencies of 5 steps each. During each of the four steps a different line in each of four groups of 16 lines is addressed, whereas during the immediately preceding step a read-out took place from the buffer memory BM to the output buffer UB serving as parallell-series converter of element information to the four outgoing lines addressed during the aforesaid four steps. As indicated in FIG. 3, the word in the buffer memory BM containing the memory cells 101, 201, 301 and 401 is addressed with address 001 and the word containing cells 116-416 with address 016. On line f) in FIG. 4 there is shown by means of the fully drawn pulses how the new element information in memory cell 416 is transferred to the output buffer UB during addressing step 016 and, during the first subsequent step 416, is fed out on bus DEB as shown on line g) in FIG. 4. The time relation between addressing steps 101, 016 and 416 will be seen from FIG. 2, lines c), g) and h).

In the same way as described for the start element the subsequent data element is processed which in FIG. 4 has Z state. According to FIG. 4, line c), no sampling pulses occur during this interval, so that the element information which will be stored in the decoder memory AKM, memory word 101, will have the value 0. On lines e), f) and g) in FIG. 4 this value is represented by dotted pulses.

On line h) in FIG. 4 is shown the appearance of the regenerated start element as it is transmitted to the B subscriber after reconstitution in the line equipment with the aid of the indication pulses as shown on line g). The regeneration device RA consists of a bistable flip-flop which is set to one or the other position in dependence on the values of the indication pulses. As is seen, the element has been reproduced with length equal to a unit interval.

According to the example the read-out of the indication values takes place at a frequency equal to the sampling frequency, i.e. in the example 15 per unit interval. But it is equally possible to transmit the indication values at a lower frequency, for example one third of the sampling frequency.

Figure 5:
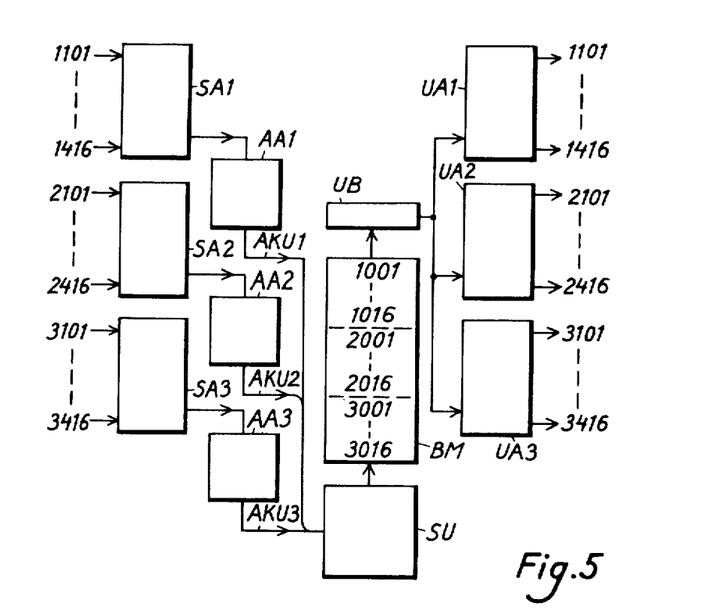

The reason for the high sampling frequency used is the desired resolution of received character elements. For the subsequent processing of the element information a lower rate, however, suffices. The fact can be utilized for extension of the equipment in the manner that several sampling devices or read-out devices, each with its line group, interwork with a common extended buffer memory while retaining a common control equipment furnished with a correspondingly extended switching memory. The switch logic of the control equipment must then work on the time division principle, in which case, in FIG. 5, for example three sampling devices AA1 - AA3 for each 64 lines, numbered L 1101 - 1416, L 2101 - 2416 and L 3101 - 3416 respectively, and three corresponding readout devices UA 1 - UA 3 are successively served in a cyclical pattern. According to an example which will be explained with reference to lines i) - o) in FIG. 4 the element information relating, for example, to line L 1101 is made accessible on the output AKU 1 from the decoder device AA 1 during three successive addressing steps 1101, as is illustrated on line i). The time division principle is illustrated by means of the three lines j), k) and l), which show the times at which the first memory word in each sampling device is processed, i.e. 1101, 2101 and 3101. Every time coincidence occurs between the pulses on line i) and line j) shown by the pulses on line m) a transfer of the element information takes place via output AKU 1 from decoder device AA 1 to the buffer memory BM, where, according to the example, it is placed in memory cell 2416 in a memory area belonging to the line group of the second read-out device UA 2.

The write-in in the buffer memory takes place in accordance with the address information in the address register memory, while the transfer to the output buffer takes place cyclically and successively for the respective line groups in such a way that the memory words in the respective groups, e.g. 2001- 2016, are transferred in a sequence in coordination with the addressing of corresponding line equipments in the read-out device. It is thus apparent that, while the sampling devices work in parallel with one another at the same sampling speed as in the case when the transit exchange contains a single line group, the read-out devices will work at an average speed which is one-third of the sampling speed due to the sequential addressing of the respective line groups. In FIG. 4 there is shown on line n) the transfer of memory word 2016 from the buffer memory BM to the output buffer UB. The times for this transfer come immediately before the pulses on line m), which relate to the processing times for address 2101. The appearance of the regenerated start element is shown on line o).

Figure 6:
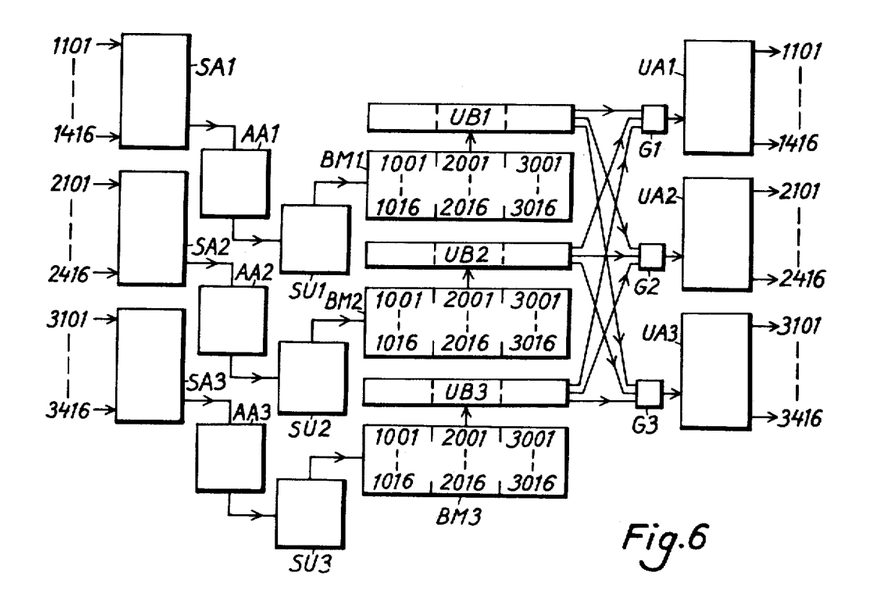

Another advantage of the invention is that one can very simply achieve an extension to, for example, twice or three times the capacity merely by increasing the capacity of the buffer memory and output buffer in a number of identical units of the type described in conjunction with FIG. 1–4 and interconnecting these identical units with one another with simple OR circuits, G1 - G3 in FIG. 6. This requires a prolongation of the memory words in all units so that, in each buffer memory, memory cells are arranged not only for the addresses in its own unit but also for the addresses in all other units. The read-out then takes place in parallel from corresponding memory cells in all units, while of course only one of the simultaneously addressed memory cells contains any information.

We claim:

1. Apparatus in a transit exchange for the transmission of asynchronous data signals representing character elements having a given character structure and data rate from sending terminal equipments to receiving terminal equipments with the aid of a control equipment, including a computer, at least one sampling device common to a number of sending terminal equipments and arranged for working with the time division multiplex principle for sampling with the aid of sampling pulses a number of incoming lines for the instantaneous values of received data signals, and a detector means operating synchronously with said sampling device, said detector means including a decoder logic, operating in a time division mode, successively processing the sampling pulses to establish the binary value of each character element and, in correspondence with said binary value, to produce a binary indication signal, the improvement comprising an intermediate memory connected to said decoder logic for successive storage of indication values represented by the indication signal in an addressed location associated with the receiving terminal equipment, a read-out device including means for transferring cyclically from the intermediate memory the indication values, and a regeneration means associated with the receiving terminal equipment receiving said indication values for forming therefrom data signals which switch value in synchronism with the indication signals.

2. In the transit exchange according to claim 1, said intermediate memory comprises a parallel-series converter including means for receiving simultaneously a number of said indication values relating to a corresponding number of said receiving terminal equipments and means for reading out sequentially said indication values.

3. In the transit exchange according to claim 2, wherein said intermediate memory is arranged for the storage of said indication values in memory words, each memory word having a number of bit positions corresponding to a number of indication values to be transferred simultaneously.

4. In the transit exchange according to claim 1, wherein said read-out device is arranged for the transfer of said indication values to said regeneration means at a specific repetition frequency.

5. In the transit exchange according to claim 4, wherein said sampling frequency is equal to said repetition frequency.

6. In the transit exchange according to claim 4, wherein said sampling frequency is a multiple of said repetition frequency.

7. In the transit exchange according to claim 1, the apparatus further comprising a plurality of said sampling devices arranged to cooperate with a group of said sending terminals and to operate at said sampling frequency, a corresponding number of said read-out devices arranged to cooperate with an assigned portion of said intermediate memory, and said intermediate memory including means for controlling the storage and read-out of said indication values to occur sequentially and successively for each of said sampling and read-out devices, respectively.

* * * * *